US005839072A

United States Patent [19]
Chien

[11] Patent Number: 5,839,072
[45] Date of Patent: Nov. 17, 1998

[54] ROUTING AN INCOMING CALL TO A PORTED MOBILE STATION WITHIN A TELECOMMUNICATIONS NETWORK

[75] Inventor: Gung-Shih Chien, Plano, Tex.

[73] Assignee: Ericsson Inc., Research Triangle Park, N.C.

[21] Appl. No.: 656,723

[22] Filed: Jun. 3, 1996

[51] Int. Cl.$^6$ ............................................. H04Q 7/24
[52] U.S. Cl. ......................... 455/445; 455/432; 455/436
[58] Field of Search .................................. 455/432, 433, 455/436, 445, 414, 417, 438, 439, 461; 379/196, 207, 258, 308, 309

[56] References Cited

U.S. PATENT DOCUMENTS

| | | | |
|---|---|---|---|
| 4,310,727 | 1/1982 | Lawser | 179/18 B |
| 4,754,479 | 6/1988 | Bicknell et al. | 379/207 |
| 5,237,604 | 8/1993 | Ryan | 379/220 |
| 5,247,571 | 9/1993 | Kay et al. | 379/207 |
| 5,251,248 | 10/1993 | Tokunaga et al. | 379/58 |
| 5,369,684 | 11/1994 | Buhl et al. | 455/432 |
| 5,400,390 | 3/1995 | Salin | 379/59 |
| 5,422,941 | 6/1995 | Hasenauer et al. | 379/207 |
| 5,423,068 | 6/1995 | Hecker | 455/56.1 |
| 5,442,683 | 8/1995 | Hoogeveen | 379/60 |
| 5,454,027 | 9/1995 | Kennedy et al. | 455/432 |
| 5,455,855 | 10/1995 | Hokari | 379/229 |
| 5,457,736 | 10/1995 | Cain et al. | 379/60 |
| 5,467,381 | 11/1995 | Peltonen et al. | 455/433 |
| 5,481,603 | 1/1996 | Gutierrez et al. | 379/221 |
| 5,504,804 | 4/1996 | Widmark et al. | 379/63 |
| 5,654,958 | 6/1995 | Natarajan | 455/445 |
| 5,711,006 | 8/1995 | Brochu et al. | 455/445 |

FOREIGN PATENT DOCUMENTS

| | | | |
|---|---|---|---|
| 0512962 | 1/1992 | European Pat. Off. | H04Q 7/04 |
| WO9611557 | 4/1996 | WIPO | H04Q 7/38 |

OTHER PUBLICATIONS

*Freeing the Network for Competition* by Tim Bishop International Edition, vol. 29, No. 4. Apr. 1995.

*PCS No. Portability*, by Arthur Giordano and May Chan GTE Laboratories, Inc., 40 Sylvan Road, Waltham, MA 02254.

Generic Switching and Signaling Requirements for Number Portability J.J. Lichter, AT&T Network Systems, Generic Requirements, Issue 1.00 Feb. 2, 1996 – pp. 1–75.

*Primary Examiner*—Dwayne D. Bost
*Assistant Examiner*—Jean A. Gelin
*Attorney, Agent, or Firm*—Jenkens & Gilchrist, P.C.

[57] ABSTRACT

A centralized database connected to the next to last Service Switching Point (SSP) within a Public Switched Telephone Network (PSTN) interfacing with a ported Public Land Mobile Network (PLMN) stores correlation data correlating a network address representing the new home location register (HLR) associated with a ported mobile station with a mobile identification number representing that particular mobile station. Whenever an incoming signal such as an Initial Address Message (IAM) is received by the next to last SSP, a database query is performed towards the centralized database to retrieve the network address representing the new HLR. The retrieved HLR network address is then utilized as the Called Party Address (CdPn). The original mobile station number is also included into the Generic Address Parameter (GAP) of the routed IAM signal. The modified IAM signal is then routed to the proper Gateway Mobile Switching Center (GMSC) and accordingly forwarded to a mobile switching center (MSC) currently serving the ported mobile station.

31 Claims, 8 Drawing Sheets

INITIAL ADDRESS MESSAGE

| PARAMETER | LENGTH | | | |
|---|---|---|---|---|
| MESSAGE TYPE | 1 | 140 | | |
| NATURE OF CONNECTION INDICATOR | 1 | | | |
| ... | | | | |
| Cdpn-CALLED PARTY NUMBER | 2-11 | 210 | | |
| ... | | | | |
| Cgpn CALLING PARTY NUMBER | 5-12 | 220 | | |
| ... | | | | |
| GAF-GENEAC ADDRESS PARAMETER | 6-13 | 230 | | |
| ... | | | | |

| GNR TABLE | |
|---|---|
| MSISDN | GATEWAY ROUTING NUMBER |
| 214 555 1212 | HLR NETWORK ADDRESS 1 |
| 214 855 3214 | HLR NETWORK ADDRESS 2 |
| 817 681 1221 | HLR NETWORK ADDRESS 3 |
| 213 123 4561 | HLR NETWORK ADDRESS 4 |
| ⋮ | ⋮ N |

ROUTING AN INCOMING CALL TO A PORTED MOBILE STATION WITHIN A TELECOMMUNICATIONS NETWORK

PRIORITY UNDER 35 U.S.C. § 109(e) & 37 C.F.R. § 1.78(a)(1)

This nonprovisional application claims priority based upon a prior U.S. Provisional Patent Application entitled "Routing A Data Signal To A Mobile Station Within A Telecommunications Network", Ser. No. 60/014,238, filed Mar. 26, 1996, in the names of Erkki Joensuu, Mahesh Patel, and Gung-Shih Chien.

CROSS REFERENCES TO RELATED APPLICATIONS

This nonprovisional U.S. Patent Application contains subject matter related to copending Nonprovisional U.S. patent application Ser. No. 08/655,088, entitled "Routing A Data Signal To A Mobile Station Within A Telecommunications Network", filed Jun. 3, 1996 (Attorney Docket No. 27943-00048), hereby incorporated by reference herein.

BACKGROUND OF THE INVENTION

1. Technical Field of the Invention

The present invention relates to a mobile telecommunications network and, in particular, to the routing of an incoming call to a mobile station relocated from a first home location register to a second home location register.

2. Description of Related Art

Within the Global System for Mobile (GSM) Communication or the Personal Communications System (PCS), each mobile station is assigned a unique identification number known as a Mobile Station Integrated Services Digital Network (MSISDN) number. A MSISDN number is dialed whenever a caller wants to communicate with a particular mobile station. The telecommunications network, by analyzing a part of the dialed MSISDN number, determines the particular home location register (HLR) which is associated with that mobile station and stores routing information identifying the mobile switching center (MSC) currently serving the mobile station. By retrieving and utilizing such routing information, the telecommunications network is able to locate the mobile station in response to an incoming call so that a call connection can be established between the incoming caller and the mobile station.

As they move from city-to-city or region-to-region within the cellular network, mobile subscribers often relocate from a first service area served by a first HLR to a second service area served by a second HLR. By relocating, a particular mobile station's pre-existing subscriber agreement with the first HLR is terminated and a new subscription agreement with the second HLR is established. However, specific series of MSISDN numbers are pre-assigned to each HLR. Therefore, by relocating from one HLR to another, the mobile station accordingly must be assigned a new MSISDN number within the series pre-assigned to the new second HLR. Changing the assigned MSISDN number is a cumbersome process in part because the mobile subscriber has to take his mobile station in for service and also inconveniently notify all relevant parties of his new MSISDN number (directory number).

American Telephone & Telegraph (AT&T) has proposed the concept of the use of a location routing number (LRN) to alleviate some of the analogous problems associated with wireline terminals of subscribers who move from one region to another. In accordance with the LRN concept, a centralized database storing a network address representing the end office currently serving the wireline terminal is queried by a service switching point (SSP) within a Public Switched Telephone Network (PSTN) to route an incoming call to the correct end office. However, the above LRN concept is inapplicable for the mobile telecommunications environment because a mobile station is not physically attached to a single end office or mobile switching center (MSC). As a mobile station travels from one geographic area to another geographic area, a number of MSCs provide mobile service to the traveling mobile station. Therefore, implementing a centralized database with a network address representing a particular end office or MSC does not solve the above number portability problem within the mobile telecommunications environment.

Accordingly, there is a need for a scheme which would enable a mobile station to relocate from a first HLR to a second HLR without having to change the assigned MSISDN number and still enable the serving mobile telecommunications network to route incoming calls to the ported mobile station.

SUMMARY OF THE INVENTION

The present invention provides a method and apparatus for transporting a telecommunications signal to a mobile station relocated (ported) from a first home location register (HLR) to a second HLR. Such a signal includes an incoming call signal for establishing a call connection with the ported mobile station. A network address representing an HLR associated with a mobile station and a mobile identification number representing that particular mobile station are correlated and stored in a centralized database. Whenever an incoming signal is received by a signal transferring telecommunications exchange within a Public Switched Telephone Network (PSTN), another signal requesting the network address of the home HLR associated with the mobile station, as indicated by the incoming signal, is transmitted to the centralized database. The centralized database retrieves the network address of the HLR associated with that given mobile station and transmits the retrieved network address back to the requesting telecommunications exchange. Upon receipt of the network address, the telecommunications exchange transmits the incoming signal utilizing the retrieved network address as the called party number (CdPn). The transmitted incoming signal further includes the mobile identification number within one of the optional parameters. The transmitted signal is routed to the gateway mobile switching center (GMSC) associated with the indicated HLR network address. The GMSC then extracts the included mobile identification number and transmits a request signal to the indicated HLR for further routing instructions. The serving HLR receives the request signal, retrieves the requested information, and transmits the retrieved routing instruction back to the GMSC. The GMSC then routes the incoming signal to a particular mobile switching center (MSC) indicated by the retrieved routing instruction.

In one embodiment, the telecommunications exchange includes a service switching point (SSP). In another embodiment, the centralized database includes a signal control point (SCP).

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
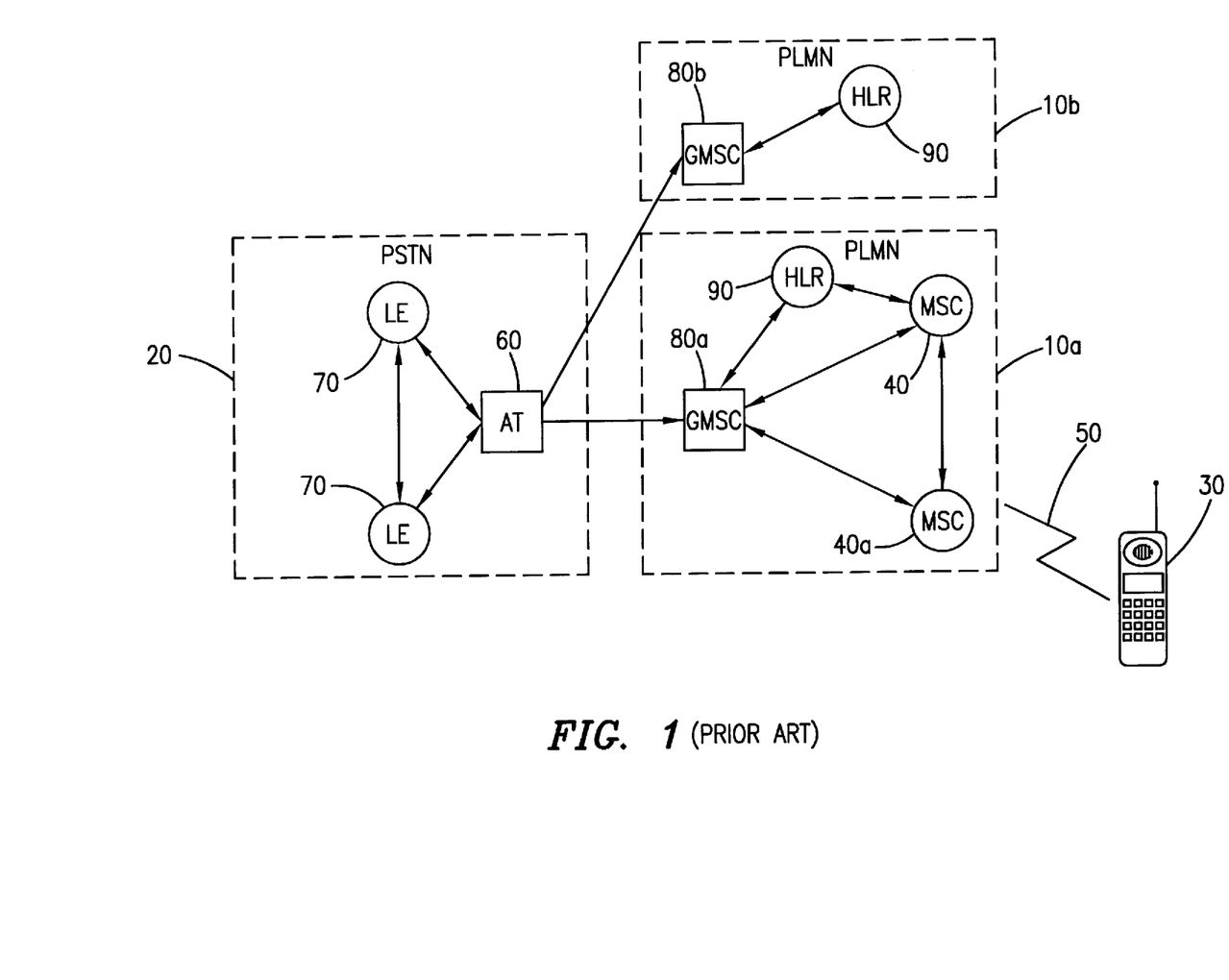
FIG. 1 is a block diagram illustrating the network interconnection of multiple Public Land Mobile Networks (PLMNs) to a Public Switched Telephone Network (PSTN)

FIG. 1 is a block diagram illustrating the network interconnection of multiple Public Land Mobile Networks (PLMNs) 10a–10b to a Public Switched Telephone Network (PSTN) 20. A mobile station 30 (also known as a mobile terminal or equipment) is associated with one of the PLMNs 10 as the home PLMN 10a. Within each PLMN 10, e.g., PLMN 10a, there are a number of different mobile switching centers (MSCs) 40 servicing the geographic area covered by the network. A mobile station 30 communicates with a radio base station (not shown) connected to one of the MSCs 40 via over-the-air communications links 50. The mobile station 30 served by one PLMN 10a then communicates with other wireline and wireless terminals by means of connections to the PSTN 20. The access tandem (AT) 60 within the PSTN 20 routes the mobile calls generated from the one PLMN 10a to wireline terminals serviced by one of its local exchanges (LEs) 70 within the PSTN 20, or to another PLMN 10b by a way of its gateway mobile switching center (GMSC) 80b.

For an incoming call intended for the mobile station 30, the incoming call is first routed to the GMSC 80a serving the home PLMN 10a. The GMSC 80a sends a signal requesting routing information to the home location register (HLR) 90 for that mobile station 30. The HLR 90 (which stores subscriber information and keeps track of the current location of the mobile station 30) returns a routing instruction back to the GMSC 80a. The returned routing instruction includes a network address indicating which MSC 40 (for example, MSC 40a) is currently serving the mobile station 30. Upon receipt of such routing information, the GMSC 80a transmits the incoming call to the serving MSC 40a. The serving MSC 40a then establishes a speech connection with the mobile station 30 located within its MSC serving area.

With the continuing development in the mobile telecommunications technology and the increasing number of mobile subscribers, an innovative concept called "number portability" is becoming popular. The number portability concept allows a mobile subscriber to relocate or "port" from an existing service area to a new PLMN area or HLR area without changing the mobile subscriber's assigned Mobile Station Integrated Services Digital Network (MSISDN) number or directory number. By not changing the assigned MSISDN number, the mobile subscriber need not have his mobile station manually serviced to encode a new MSISDN number. The mobile subscriber also need not inconveniently notify his friends and associates of his new MSISDN number.

Number portability also allows more efficient usage and better management of the network resources. If a PLMN comprises a number of HLRs, and the workload or capacity is unevenly distributed across the network, it would be advantageous to transfer some of the subscription agreements or subscriber information from one of the HLRs with overloaded capacity to another HLR with lesser load without changing the MSISDN numbers assigned to the associated mobile stations. By reallocating some of the subscriber information and evenly distributing the workload, the PLMN is better able to manage its resources and workload.

Figure 2:
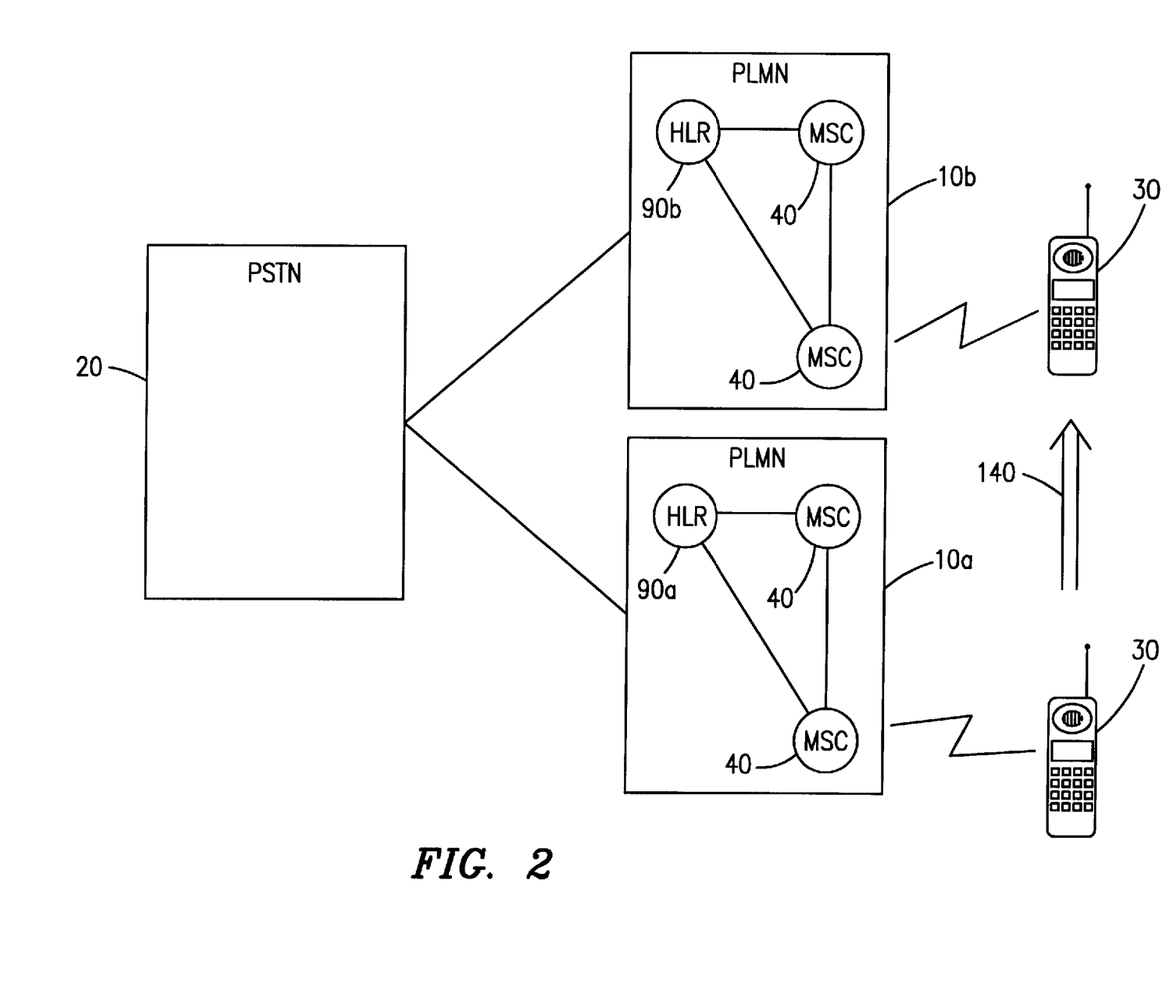
FIG. 2 illustrates a mobile station relocating from a first home location register (HLR) associated with a first PLMN to a second HLR associated with a second PLMN.

Reference is now made to FIG. 2 where a mobile station 30 associated with a first HLR 90a within a first PLMN 10a is shown relocating or porting 140 to a second HLR 90b within a second PLMN 10b (an inter-PLMN number portability). The mobile station 30 is initially registered with the PLMN 10a as the home PLMN. All incoming calls either from the PSTN 20 or another PLMN are received by the GMSC (not shown in FIG. 2, see FIG. 1) within the PLMN 10a and accordingly routed to the serving MSC 40a. As described previously, the GMSC properly routes an incoming call to the serving MSC 40a because the dialed MSISDN number includes a value indicative of which HLR within the home PLMN 10a is storing the requisite subscriber information. Consequently, the GMSC analyzes the received MSISDN number, determines the appropriate HLR, requests routing information from the determined HLR, and then routes the incoming call to the appropriate MSC.

In accordance with the concept of number portability and as illustrated by the relocation 140, the mobile station 30 terminates his subscription agreement with the existing HLR 90a and registers with the new HLR 90b within the new PLMN 10b without changing his MSISDN number. However, because the MSISDN number has not been updated in the mobile station to reflect the new HLR 90b and the new PLMN 10b, all future incoming calls are still routed to the old PLMN 10a. The GMSC within the PLMN 10a is not able to reroute the received incoming calls to the relocated mobile station 30 because the GMSC is no longer able to determine the correct HLR storing the subscriber information by merely analyzing the received MSISDN number.

Figure 3:
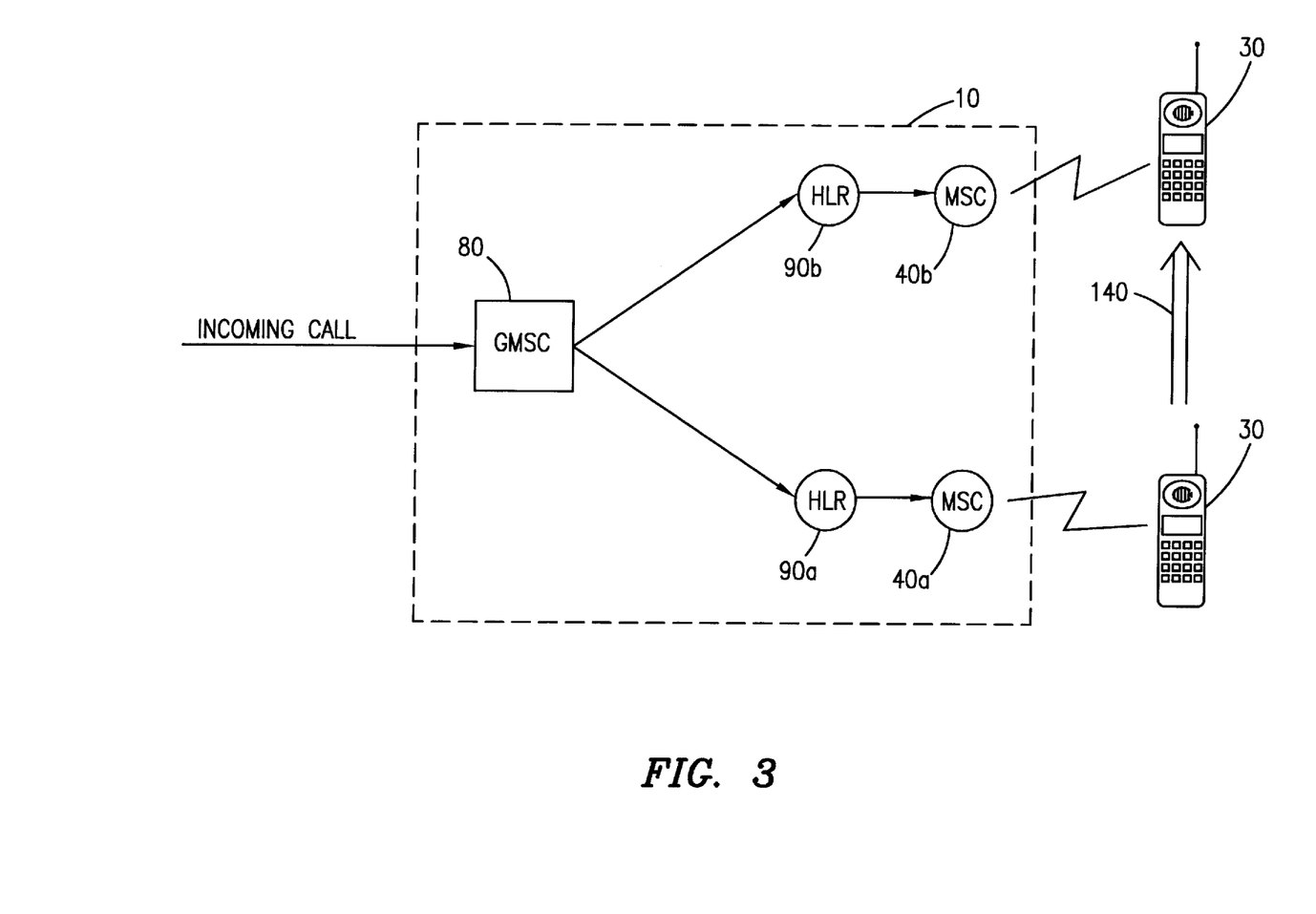
FIG. 3 illustrates a mobile station relocating from a first home location register (HLR) to a second HLR within the same PLMN.

FIG. 3 further illustrates a mobile station 30 relocating 140 from a first HLR 90a to a second HLR 90b within the same PLMN 10 (an intra-PLMN number portability) where the above problem of not locating the correct HLR 90 still exists. If the mobile station 30 relocates from a service area served by an MSC 40a closely associated with the HLR 90a to a service area served by an MSC 40b closely associated with the HLR 90b, it is efficient to register the mobile station 30 with the closer HLR 90b to minimize the signaling time and distance between the mobile station 30 and its associated HLR. Furthermore, as described previously, if the PLMN 10 has a number of HLRs 90 with unevenly distributed workload, the telecommunications network performs much more efficiently when some of the subscriber information is transferred over to a lesser used HLR for maximizing the network resources. However, because of the unaltered MSISDN number, the GMSC 80 is still requesting routing information from the old HLR 90a when the mobile station 30 has already been ported to the new HLR 90b. As a result, incoming calls are not properly routed to the mobile station 30. Accordingly, there is a need for a separate mechanism to reroute incoming signals towards the new HLR serving a ported mobile station.

Figure 4:
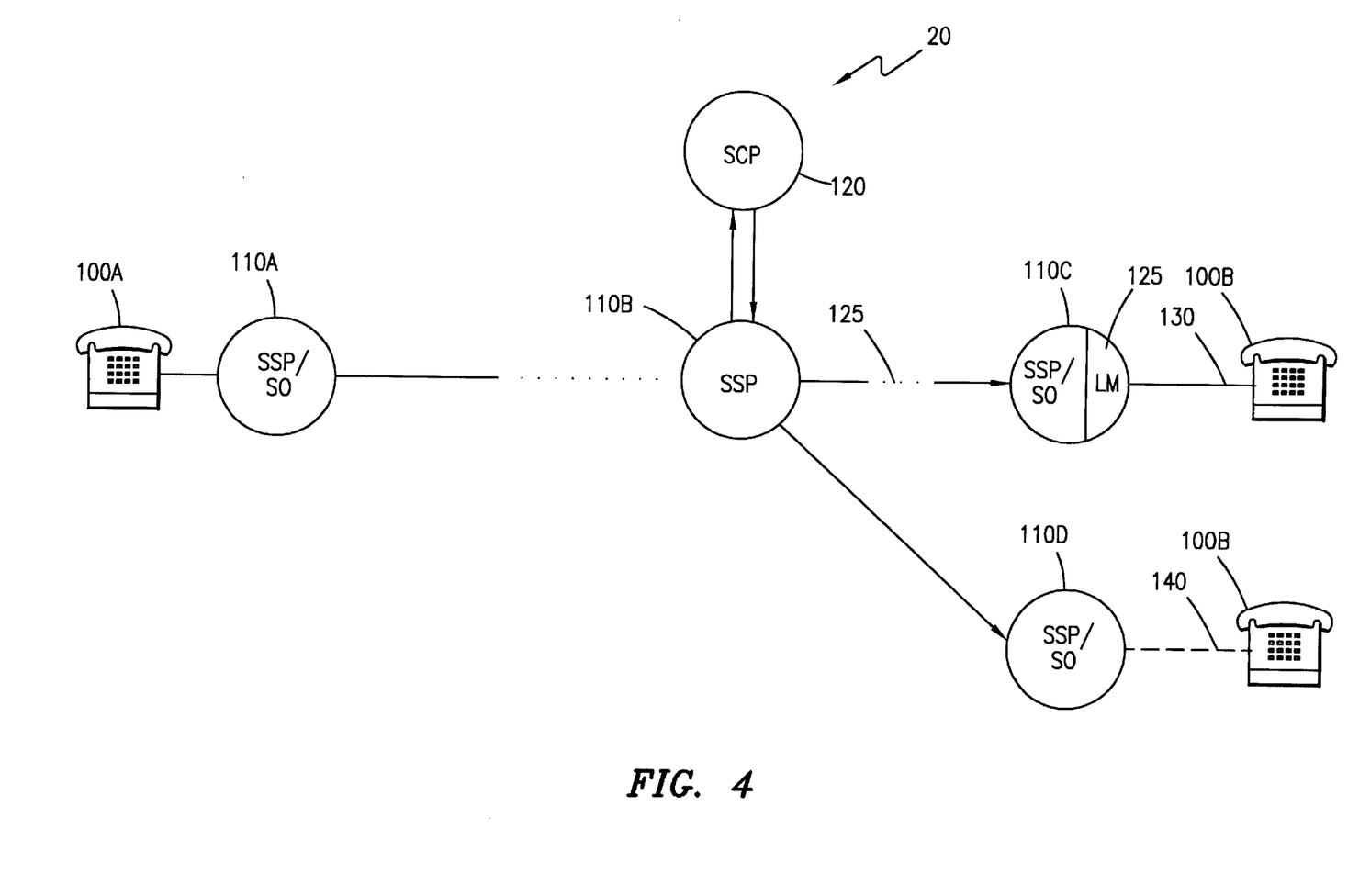
FIG. 4 is a block diagram illustrating the location routing number (LRN) system for routing an incoming call to a ported mobile station.

FIG. 4 is a block diagram illustrating the location routing number (LRN) concept for routing an incoming call to a ported wireline terminal as introduced by American Telephone & Telegraph (AT&T). In accordance with AT&T's LRN concept, a centralized database storing a network address representing the end office serving the ported wireline terminal is queried by the next to last service switching point (SSP) within the PSTN 20 for routing an incoming call. A first wireline terminal 100a originates an outgoing call connection towards a second wireline terminal 100b within the PSTN 20 by dialing a directory number representing the second wireline terminal 100b. However, the second wireline terminal 100b used to be served by a first SSP or end office 110d (hereinafter collectively referred to as an SSP/EO) but has been ported to a second SSP/EO 110c (as illustrated by a dotted line 140). Using a conventional routing mechanism, the call setup request is routed towards the first SSP/EO 100d as specified by the dialed directory number representing the wireline terminal 100b. When the call setup signal is received by the next to last SSP 110b connected to the first SSP/EO 110d, the SSP 110b performs a database query to a centralized database service control point (SCP) 120. The SCP 120 stores correlation data correlating each ported directory number with a network address representing the new SSP/EO serving the ported terminal. In response to the query request, the SCP 120 returns a network address representing the second SSP/EO 110c currently serving the wireline terminal 100b. The next to last SSP 110b uses the retrieved network address as the new Called Party Number (CdPn) in the transmitted call setup signal such as an Initial Address Message (IAM). The originally dialed directory number representing the wireline terminal 100b is also included into a Generic Address Parameter (GAP) within the IAM signal and "piggy-backed" to the serving SSP/EO 110c. Since the CdPn points to the serving SSP/EO 110c, the IAM signal is rerouted to the SSP/EO 110c instead of to the first SSP/EO 110d. The second SSP/EO 110c may be directly connected to the SSP 110b, or be connected through a number of signal transferring nodes as illustrated by a dotted line 125. Once the IAM signal is received by the second SSP/EO 110c, the encapsulated directory number representing the wireline terminal 100b is extracted from the GAP, the physical location of the wireline terminal 1000b is determined by indexing its line module (LM) 125, and a call connection is established with the ported wireline terminal 100b via a wireline 130.

By introducing a centralized database for storing a network address representing the new SSP/EO, the LRN concept solves some of the number portability problems within the PSTN environment. However, such LRN implementation is inapplicable for the PLMN environment. A mobile station within a PLMN 10 is rarely associated with just one end office or mobile switching center (MSC). Due to its inherent nature of not being connected to any physical communications medium, a mobile station freely travels into a number of different geographic areas. Each time a mobile station leaves a first MSC service area and enters into a second MSC service area, a "handoff" has to occur to transfer the service from the first MSC to the second MSC. After the handoff, the first MSC is no longer involved in the call connection. Accordingly, the idea of storing a particular end office or MSC within a centralized database is inapplicable for the PLMN environment.

Figure 5:
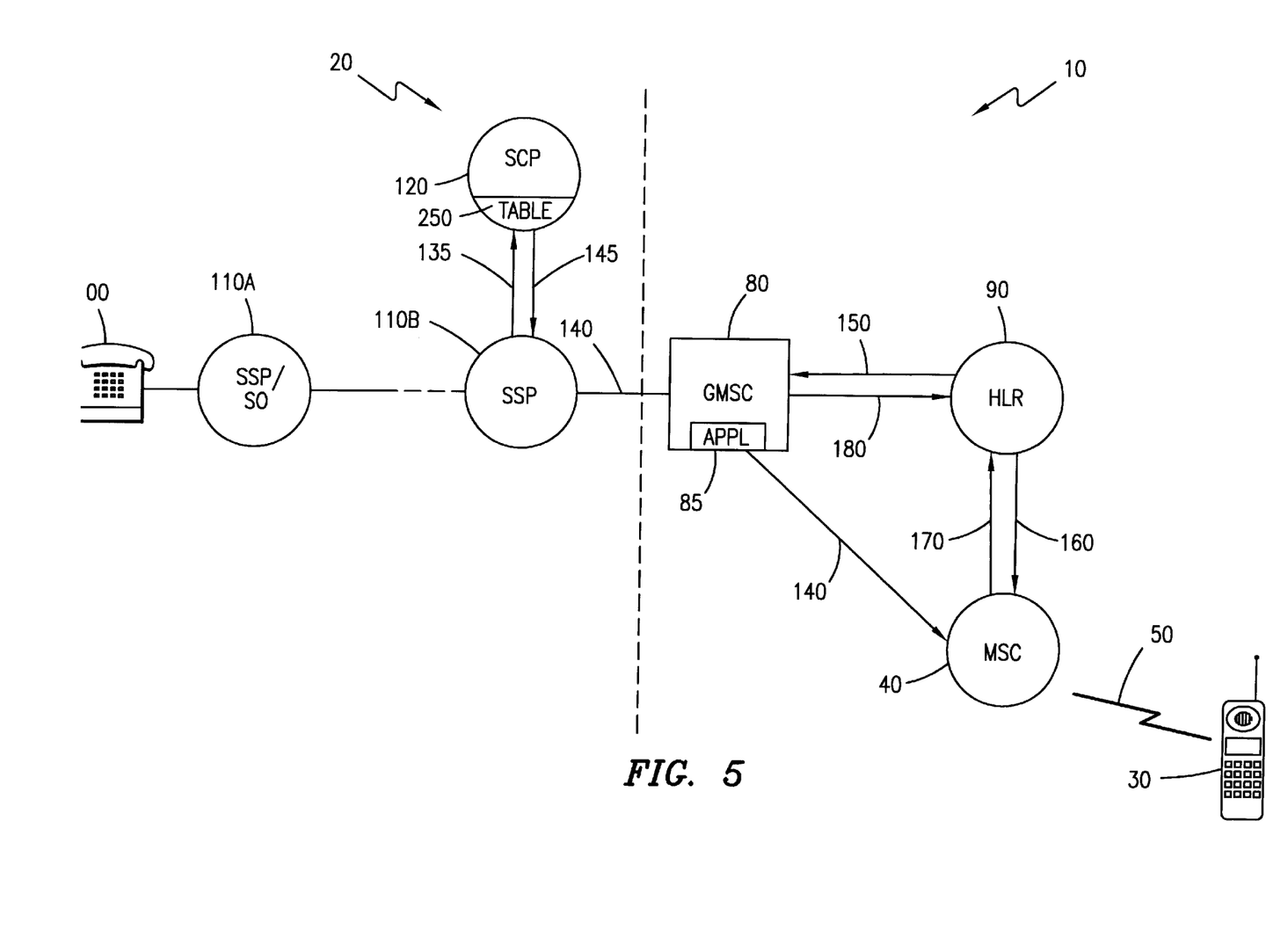
FIG. 5 is a block diagram illustrating the gateway routing number (GRN) system for routing an incoming call to a ported mobile station in accordance with the teachings of the present invention.

In accordance with the teachings of the present invention, FIG. 5 is a block diagram illustrating the gateway routing number (GRN) concept for routing an incoming call to a ported mobile station. Instead of maintaining a centralized database for storing a network address representing a particular end office currently serving the mobile station 30, a centralized database for storing a network address representing a PLMN or more particularly a HLR 90 currently serving the mobile station 30 is instead maintained (hereinafter referred to as a Gateway Routing Number—GRN).

A wireline terminal 100 or any other telecommunications terminal originates an outgoing call connection by dialing a mobile identification number such as a Mobile Station Integrated Service Digital Network (MSISDN) number representing the mobile station 30. The call connection signal is routed via the conventional routing mechanism until it reaches the next to last SSP 110b within the PSTN 20 as described in FIG. 4. The SSP 110b then sends a query signal 135 to the centralized database such as an SCP 120 requesting the GRN representing the home HLR associated with the mobile station 30. The SCP 120 indexes its memory table 250 with the received MSISDN number and retrieves the relevant GRN. The retrieved GRN is then transmitted back to the SSP 110b via a return signal 145. The SSP 110b assigns the retrieved GRN as the Called Party Number (CdPn) for the call setup signal 140 such as an Initial Address Message (IAM) and transmits it over to the PLMN 10. The dialed MSISDN number is also included into one of the optional parameters such as a Generic Address Parameter (GAP) within the IAM signal 140. By analyzing the transmitted GRN representing the home HLR 90, the PSTN 20 is able to route the IAM signal 140 to the entry point—GMSC 80 of the serving PLMN 10. Upon receipt of the IAM signal 140, an application module 85 within the GMSC 80 extracts the included MSISDN number from the GAP and transmits a Mobile Application Part (MAP) based signal 150 such as a Send Routing Information (SRI) signal to the indicated HLR 90. The transmitted SRI signal 150 further includes the extracted MSISDN number and uses the received GRN as the Global Title (GT) for Called Party Address.

When the HLR 90 receives the SRI signal 150, it determines the corresponding International Mobile Subscriber Identity (IMSI) for the received MSISDN number and transmits another MAP based signal 160 requesting routing number to the serving MSC 40. The serving MSC 40 determines the current geographic location of the mobile station 30 and accordingly returns a routing number to the HLR 90 via an acknowledgment signal 170. The HLR 90, in turn, returns the routing number to the GMSC 80 via yet another acknowledgment signal 180. The GMSC 80 then reroutes the original IAM signal 140 to the serving MSC 40 as indicated by the received routing number. As a result, a call connection between the originating terminal 100 and the ported mobile terminal 30 is established via the radio link 50.

Figure 6:
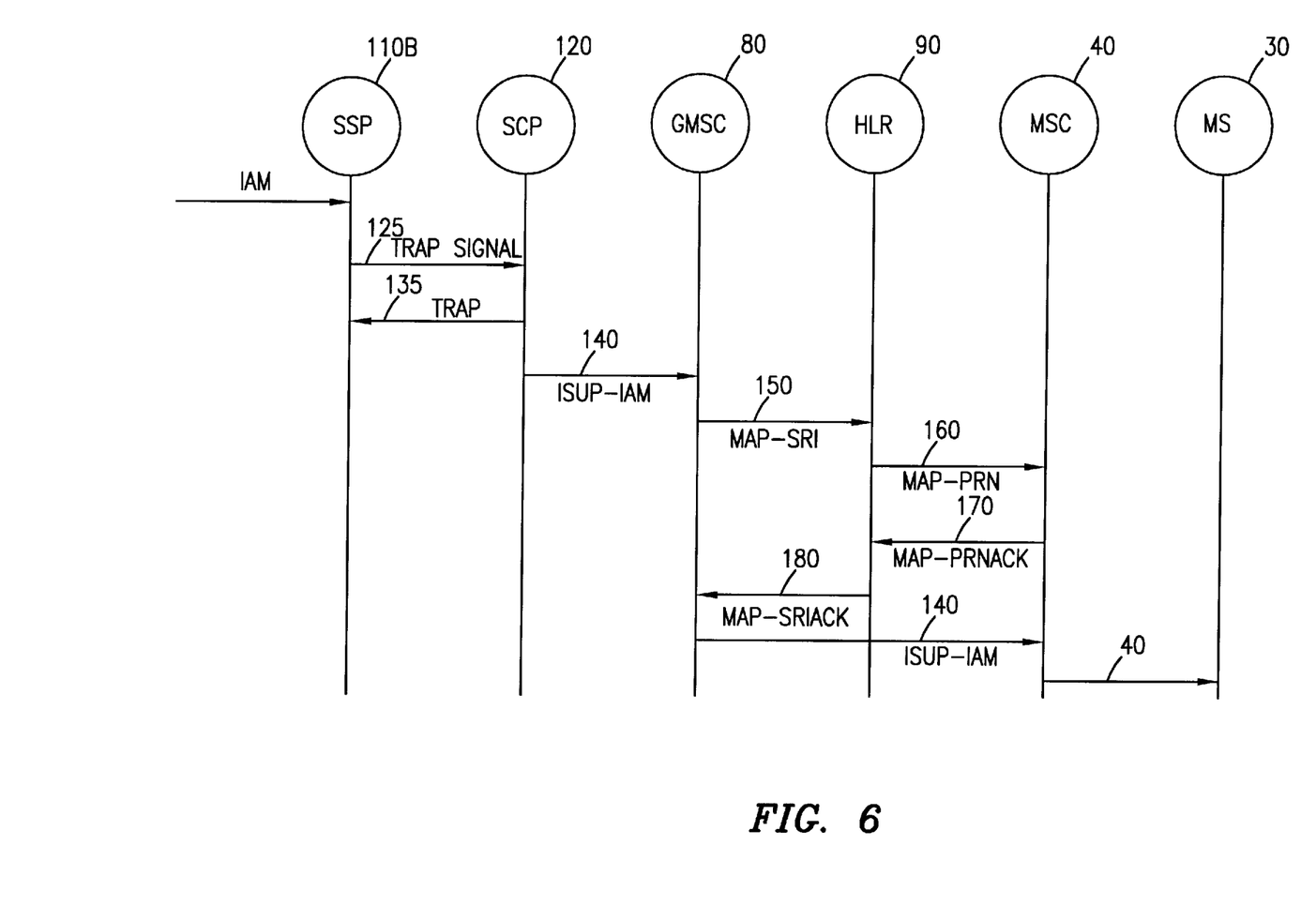
FIG. 6 is a signal sequence diagram illustrating the gateway routing number (GRN) system for routing an incoming call to a ported mobile station.

FIG. 6 is a signal sequence diagram for illustrating the routing of an incoming call to a ported mobile station in accordance with the teachings of the present invention. The next to last SSP 110b connected to the original HLR 90 (the HLR the mobile station has been ported from) receives an incoming signal such as an Initial Address Message (IAM) 140 intended for the ported mobile station 30. The SSP 110b transmits an application layer signal 125 to the centralized database SCP 120 with the received MSISDN number. Such an application layer signal includes a Transaction Capability Application Part (TCAP) signal utilizing the Signaling Connection Control Part layer of the Signaling System No. 7 (SS7) protocol. The SCP 120 retrieves the stored network address representing the home HLR 90 currently serving the mobile station 30 by indexing on the received MSISDN. Another application layer signal 135 is returned back to the SSP 110b with the retrieved network address (GRN). The SSP 110b then assigns the retrieved network address as the Called Party Number (CdPn) for the IAM signal 140 and transmits the IAM message 140 to the GMSC 80 associated with the indicated HLR 90. While transmitting the IAM signal 140 to the GMSC 80, the received MSISDN number is stored into one of the optional parameters within the transmitted IAM signal 140. Such a parameter includes a Generic Address Parameter (GAP). Once the IAM signal 140 is received by the GMSC 80, the GMSC 80 transmits a MAP based signal such as a Send Routing Information (SRI) signal 150 to the home HLR 90 for routing instructions. The received network address or GRN is utilized as a global title number to route the SRI signal 150 to the HLR 90. The MSISDN number encapsulated within the GAP is extracted and further included in the transmitted SRI signal 150. The serving HLR 90, in response to a receipt of the SRI signal 150, determines the corresponding IMSI number for the indicated MSISDN number and transmits another MAP based signal such as a Provide Roaming Number (PRN) signal 160 to the MSC 40 currently serving the mobile station. In response to a receipt of the PRN signal 160, the MSC 40 accordingly returns a routing number back to the home HLR 90 via a PRN acknowledgment (PRNack) signal 170. The HLR 90 in turn returns the routing number to the GMSC 80 via an SRI acknowledgment (SRIack) signal 180. Utilizing the received routing number as the new CdPn, the GMSC 80 routes the IAM signal 140 to the serving MSC 40. By alerting the mobile station 30, a call connection between the MSC 40 and the mobile station 30 is then established.

Figure 7:
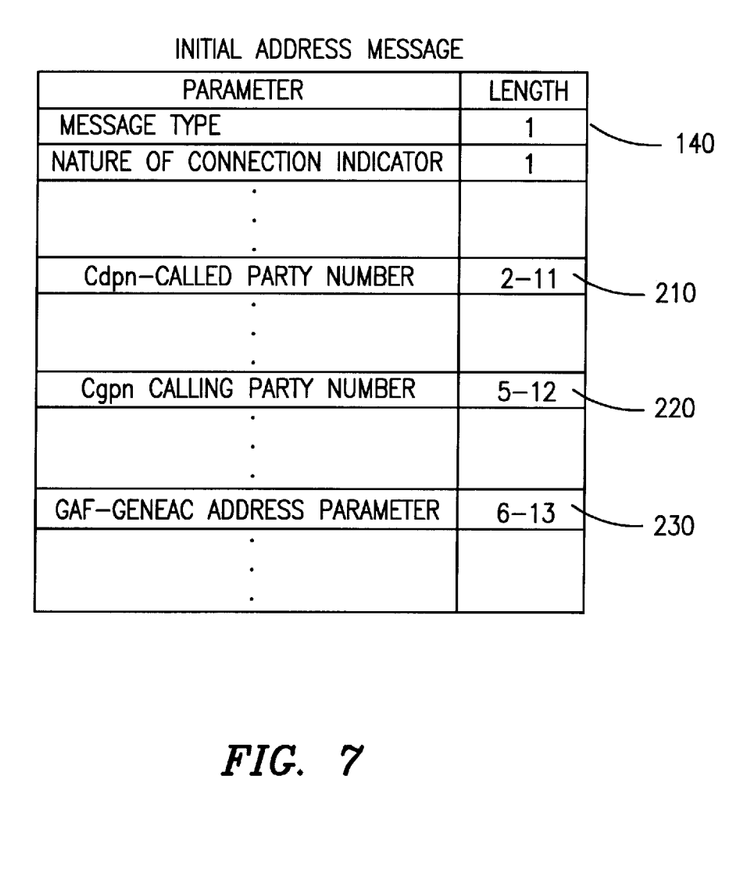
FIG. 7 is a structural diagram illustrating the data format of an Initial Address Message (IAM)

FIG. 7 is a structural diagram illustrating the data format of the Initial Address Message (IAM) 140. Within the IAM signal 140, the Called Party Number (CdPn) parameter 210 stores the address of the destination terminal or station. The Calling Party Number (CgPn) parameter 220 also stores the address of the originating terminal or station. Such CgPn parameter 220 is later utilized by the destination node to return a signal back to the originating node. In accordance with the teachings of the present invention, the Generic Address Parameter (GAP) 230 stores the MSISDN number representing the mobile station that has been ported from a first HLR to a second HLR within the mobile telecommunications environment. When the GMSC receives the IAM signal with the GRN as the CdPn, the MSISDN number stored in the GAP is extracted and utilized for the SRI MAP signal.

Figure 8:
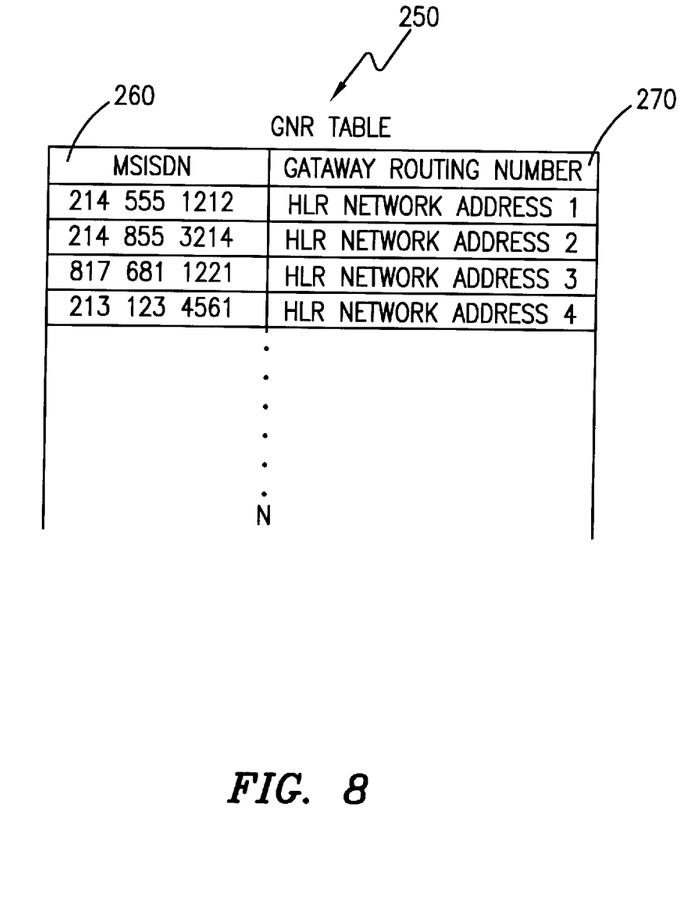
FIG. 8 is a block diagram illustrating the data structure of a database table for correlating a mobile identification number representing a mobile station with a network address for the associated HLR.

FIG. 8 is a block diagram illustrating an exemplary data structure of a database table 250 within a centralized database such as the SCP 120 (not shown, see FIG. 5). The database table 250 is for correlating a mobile identification number 260 such as an MSISDN number representing a particular mobile station with a network address 270 identifying the associated HLR serving that particular mobile station. By utilizing a relational database as shown in FIG. 8, the centralized database or the SCP may determine the network address representing the HLR currently serving the ported mobile station by indexing on the received MSISDN number.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for retrieving subscriber information associated with a mobile station, said mobile station being assigned to a particular home location register (HLR), said particular HLR storing said subscriber information associated with said mobile station, said method comprising the steps of:

transmitting a first signal with a mobile station identification number from a telecommunications exchange to a centralized database, said first signal requesting a first network address representing said particular HLR;

determining said first network address by indexing on said mobile station identification number within said centralized database;

transmitting said determining first network address back to said telecommunications exchange;

transmitting a second signal from said telecommunications exchange to a gateway mobile switching center (GMSC) associated with said determined first network address;

transmitting a third signal from said GMSC to said particular HLR using said determined first network address, said third signal requesting said subscriber information from said HLR;

retrieving said subscriber information in response to a reception of said third signal by said HLR; and transmitting said retrieved subscriber information associated with said mobile station back to said GMSC.

2. The method of claim 1 wherein said mobile station identification number comprises a Mobile Station Integrated Services Digital Network (MSISDN) number.

3. The method of claim 1 wherein said telecommunications exchange comprises a Service Switching Point (SSP).

4. The method of claim 3 wherein said centralized database comprises a Service Control Point (SCP).

5. The method of claim 1 wherein said step of transmitting said retrieved subscriber information further comprises the step of transmitting a second network address representing a Mobile Switching Center (MSC) currently serving said mobile station.

6. The method of claim 5 further comprising, after said step of transmitting said second network address, the step of: routing said second signal from said GMSC to said MSC in response to a reception of said second network address.

7. The method of claim 1 wherein said second signal comprises a plurality of parameters, said step of transmitting said second signal further comprising the step of incorporating said mobile station identification number into one of said plurality of parameters.

8. The method claim 7 further comprising, after said step of transmitting said second signal, the step of:

extracting said mobile station identification number included in said second signal, said third signal being transmitted with said retrieved mobile station identification number.

9. The method of claim 1 wherein said second signal comprises an Initial Address Message (IAM).

10. The method of claim 9 wherein said IAM comprises a Generic Address Parameter (GAP) and wherein said step of transmitting said IAM further comprises the step of including said mobile station identification number within said GAP.

11. The method of claim 9 wherein said IAM comprises a Called Party Number (CdPn) and wherein said step of transmitting said IAM further comprises the step of including said first network address as said CdPn.

12. A method for routing a request signal toward a first home location register (HLR) serving a mobile station having an assigned identification number, said mobile station ported from an area served by a second home location register (HLR) to an area served by said first HLR without changing said identification number, said method comprising the steps of:

storing correlation data in a centralized database, said correlation data correlating said identification number representing said mobile station with a network address representing said first HLR;

retrieving said network address representing said first HLR from said centralized database by correlating said identification number with said correlation data in response to an incoming signal identified by said identification number;

routing said incoming signal to a gateway mobile switching center(GMSC) associated with said first HLR by using said retrieved network address; and transmitting a request signal from said GMSC to said first HLR using said retrieved network address.

13. The method of claim 12 wherein said identification number comprises a Mobile Station Integrated Service Digital Network (MSISDN) number for said mobile station.

14. The method of claim 12 wherein said centralized database comprises a Service Control Point (SCP) connected to a Service Switching Point (SSP) for routing incoming calls.

15. The method of claim 12 wherein said incoming signal comprises an Initial Address Message (IAM).

16. The method of claim 15 wherein said incoming signal comprises a plurality of parameters and wherein said step of routing said incoming signal to said GMSC further comprises the step of incorporating said identification number into one of said plurality of parameters.

17. The method of claim 16 wherein said step of transmitting said request signal further comprises the steps of:

extracting said included identification number from said incoming signal in response to a reception of said incoming signal by said GMSC; and transmitting said request signal with said extracted identification number from said GMSC to said first HLR.

18. The method of claim 15 wherein said incoming signal comprises a Called Party Number (CdPn) parameter and wherein said step of routing said incoming signal to said GMSC further comprises the step of including said network address as said CdPn parameter.

19. A system for correlating a mobile station with a particular home location register (HLR) within a telecommunications network, said system comprising:

a telecommunications exchange for routing an incoming signal intended for said mobile station; and a centralized database connected to said telecommunications exchange, said centralized database storing:

a first record containing identification data representing said mobile station; and a second record containing a network address representing said particular HLR, and wherein said second record is correlated with said first record when said telecommunications exchange sends a request to said centralized database for said network address, said network address being sent back to said telecommunications exchange.

20. The system of claim 19 wherein said telecommunications exchange comprises a Service Switching Point (SSP).

21. The system of claim 20 wherein said centralized database comprises a Service Control Point (SCP).

22. The system of claim 19 wherein said identification data comprises a Mobile Station Integrated Services Digital Network (MSISDN) number.

23. The system of claim 19 wherein said incoming signal comprises a plurality of parameters and wherein said centralized database further comprises:

means for retrieving said network address by indexing on said identification data; and said telecommunications exchange further comprises:

means for transmitting said incoming signal to a gateway mobile switching center (GMSC) associated with said particular HLR using said retrieved network address, said incoming signal further incorporating said identification number into one of said plurality of parameters.

24. A system for routing a request signal toward a first home location register (HLR) serving a mobile station, said mobile station ported from an area served by a second home location register to an area served by said first HLR without changing an identification number assigned to said mobile station, said system comprising:

a centralized database storing correlation data for correlating said identification number assigned to said mobile station with a network address associated with said first HLR;

a telecommunications exchange in communication with said centralized database, said telecommunications exchange receiving an incoming signal identified by said identification number, said telecommunications exchange retrieving said network address associated with said first HLR from said centralized database by indexing said identification number within said correction data, said telecommunications exchange routing said incoming signal to a gateway mobile switching center (GMSC) associated with said first HLR by utilizing said retrieved network address; and means for sending a routing request signal from said GMSC to said first HLR using said retrieved network address.

25. The system of claim 24 wherein said identification number comprises a Mobile Station Integrated Service Digital Network (MSISDN) number for said mobile station.

26. The system of claim 24 wherein said centralized database comprises a Service Control point (SCP), said telecommunication exchange comprising a Service Switching Point (SSP) for routing incoming calls.

27. The system of claim 24 wherein said incoming signal comprises an Initial Address Message (IAM).

28. The system of claim 27 wherein said incoming signal comprises a plurality of parameters and further comprising means for incorporating said identification number into one of said plurality of parameters when said incoming signal is routed to said GMSC.

29. The system of claim 28 wherein said first HLR stores subscriber information representing said mobile station and wherein said first HLR further comprises means for retrieving said subscriber information associated with said mobile station by indexing on said identification number.

30. The system of claim 29 wherein said subscriber information includes a routing number for said mobile station.

31. The system of claim 28 wherein said incoming signal further comprises a Called Party Number (CdPn) and further comprising means for including said network address as said CdPn when said incoming signal is routed to said GMSC.

* * * * *